UNITED STATES PATENT OFFICE.

WILLIAM YOULTEN, OF WESTMINSTER, LONDON, ENGLAND.

FIBER-CLEANING APPARATUS.

993,492. Specification of Letters Patent. Patented May 30, 1911.

Application filed March 6, 1906. Serial No. 304,566.

*To all whom it may concern:*

Be it known that I, WILLIAM YOULTEN, a subject of the King of England, residing at 159 Victoria street, Westminster, in the county of London, England, have invented certain new and useful Improvements in Fiber-Cleaning Apparatus; and I do hereby declare the following to be a full, clear, and exact description of the invention, such as will enable others skilled in the art to which it appertains to make and use the same.

This invention relates to the separating of dirt and the like from materials such as the refuse or waste of cotton cleaning machines, hair or wool.

For the purpose in view, I subject the material to be treated to combined beating and blowing operations in a chamber part of the containing surface of which is perforated so as to allow one ingredient, e. g., the dirt of the material under treatment to be blown through and so to be separated from the rest.

An effective machine for performing the combined beating and blowing operations (which combination of operations is the essential feature of my invention) consists of a chamber, part of the containing surface of which is perforated and inside and in the lower portion of the chamber there is a shaft parallel with the perforated portion of the containing surface, which shaft carries a series of suitably shaped blades like the blades of a fan. The shaft with its blades is so located in the chamber that the material under treatment is beaten about by the blades without serious damage to the fiber of the material and at the same time air is blown through it. The result is that the finer particles, e. g. the dirt, are carried through the perforated portion of the containing surface and the cleaned material will be left in the chamber from which it may be removed as desired.

It will be obvious that I may in one plant combine several chambers provided with beating and blowing means. Also I may arrange that the cleaned material from each chamber is, upon the opening of suitably placed flaps, carried by the air currents to a common trunk which may have perforations of various sizes communicating with corresponding chambers with the object of effecting a more or less complete separation of the differently sized particles of the cleaned material.

Figure 1:
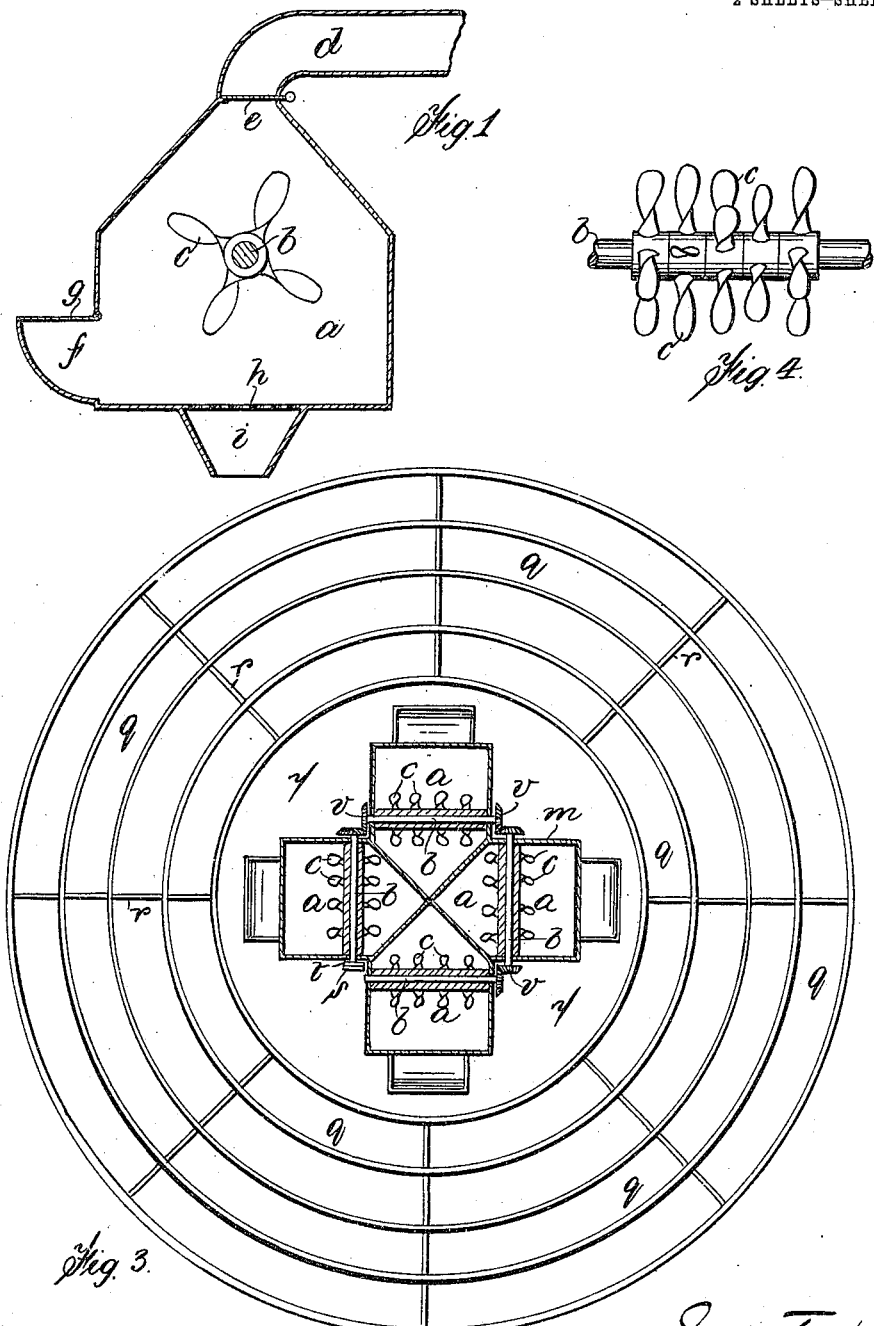
Figure 2:
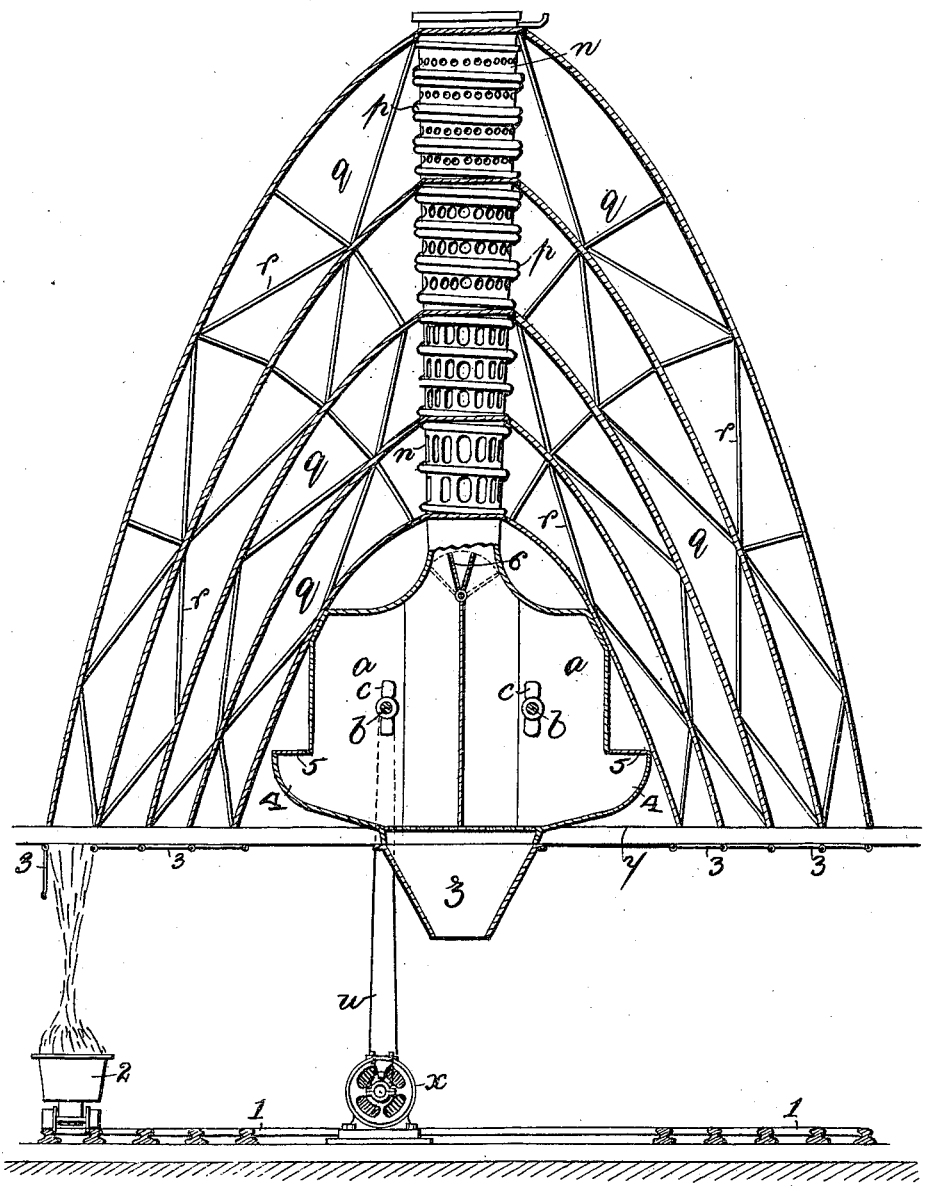

In the accompanying drawings—Figure 1 is a cross section of a simple form of my invention. Fig. 2 is a cross section, partly in elevation, of a complete plant for cleaning and grading fibrous materials. Fig. 3 is a horizontal section on the line A—B of Fig. 2, and Fig. 4 is a side view of one of the beater shafts with blades thereon.

Referring to Fig. 1, $a$ shows the chamber contracted toward the top and communicating with a pipe $d$, a sliding valve $e$ being used to open or close the connection between said chamber and said pipe. In the chamber $a$ is mounted the beater shaft $b$, provided with curved beating blades or vanes $c$. $h$ is a grid at the bottom of the chamber $a$ which communicates with a discharge chute $i$. $f$ is an extension which acts as a hopper, and is provided with a cover or slide $g$. The shaft $b$ may be rotated by any suitable means, such as an electric motor. The chute $i$ may be closed, when desired, by a door or slide $k$.

The operation of the form shown in Fig. 1 is as follows:—The door $g$ being opened, the material to be treated is thrown into the hopper $f$, the door $g$ being then closed. The shaft $b$ is then rotated at a high speed, subjecting the material under treatment to a beating and blowing action by means of the curved blades $c$. The dust, etc. falls through the grid $h$ into the chute $i$. When the beating operation has been continued for a time until the fiber has been cleaned, the slides $e$ and $k$ are opened and the material is forced outward through the pipe $d$ by a blowing action of the blades $c$.

It is obvious that instead of the small form of the invention as shown in Fig. 1, the plant may be modified without departing from the principle of my invention. For example, a number of chambers such as $a$, each provided with shafts and vanes, might be employed as shown in Figs. 2 and 3. In these figures, $m$ shows a chamber divided into four compartments $a$ by means of vertical partitions, which cross each other, as shown in Fig. 3. In each of these chambers is located a beater shaft $b$, provided with vanes or blades $c$. The four compartments $a$ each communicate at the top with a perforated trunk $n$, around which is coiled a steam pipe $p$, or other means of warming the interior of the trunk $n$ with a view to secure a progressive increase of temperature from below upwardly, and for creating an upward draft. The trunk n is flared outwardly and upwardly from its lowest point, as shown in Fig. 2. 6 represent valves or flaps situated between the chambers a and the trunk n, so that any one of said chambers may be thrown into connection with said trunk, as desired. q represents concentric chambers of parabolic or other convenient form, which may be constructed of bent steel plates riveted together and strengthened by stays r. The trunk n is provided with sets of perforations, each set delivering into one of the chambers q, and said perforations being largest at the bottom and gradually decreasing in size toward the top of the trunk n. Each of the chambers q is provided with a flap 3 at the bottom. h represents a grid or screen on the bottom of each of the compartments a. The sets of perforations in the trunk n are made decreasing in size upwardly, to afford sufficient space for the delivery of the bulkier and heavier material at the base of the trunk, while the lighter material may be easily carried to the upper parts of said trunk.

In Fig. 3 I have shown four beater shafts, each provided with vanes and geared together. One of the shafts is provided with a fixed pulley t and a loose pulley s, over which pulleys a belt u from an electric motor x is adapted to run. If desired, of course each beater shaft could be driven separately.

In Fig. 2, z represents a discharge chute for the dust, etc. 1, shows rails on which trucks 2 are adapted to run, which catch the fiber delivered from one of the chambers g when one of the flaps 3 is opened. Each of the chambers a, shown in Fig. 2, is provided with a hopper extension 4, closed by a valve or door 5. The material can be fed into the extensions 4 by an operator standing on the platform 7. The operation of this form of my invention is similar to that already described in connection with the simpler form shown in Fig. 1.

I claim:—

In an apparatus for treating fibrous material, the combination of a chamber contracted at its top and provided with an outlet at said top, partitions dividing said chamber into a plurality of similar compartments, a valve adapted to close the top of each compartment, a grid at the bottom of each compartment, a dust chute underneath said grids, and a shaft provided with blades in each of said compartments, substantially as described.

In testimony whereof, I affix my signature, in presence of two witnesses.

WILLIAM YOULTEN.

Witnesses:
Rd. B. Nicholls,
W. H. Kennard.